United States Patent [19]

Schick

[11] Patent Number: 5,701,638

[45] Date of Patent: Dec. 30, 1997

[54] BELT CONNECTOR

[75] Inventor: Jean-François Schick, Chemin du Cambas, France

[73] Assignee: Goro S. A., Saint Privat des Vieux, France

[21] Appl. No.: 632,807

[22] Filed: Apr. 17, 1996

[30] Foreign Application Priority Data

Apr. 20, 1995 [DE] Germany .................. 195 14 658.1
Dec. 1, 1995 [DE] Germany .................. 195 44 810.3

[51] Int. Cl.$^6$ .................................................. F16G 3/04
[52] U.S. Cl. ........................ 24/33 P; 24/33 B; 24/33 M; 198/844.2; 474/257
[58] Field of Search ........................ 24/33 P, 33 R, 24/33 B, 33 M, 33 C; 474/255, 256, 257; 198/844.2

[56] References Cited

U.S. PATENT DOCUMENTS

| 1,570,750 | 1/1926 | Lake ................................. 24/33 C |
| 2,179,697 | 11/1939 | Kremer .............................. 24/33 P |
| 2,507,195 | 5/1950 | Colbeck et al. . |
| 3,546,330 | 12/1970 | Thompson ....................... 24/33 C X |
| 3,742,557 | 7/1973 | Francois . |
| 3,913,180 | 10/1975 | Pray . |
| 4,023,239 | 5/1977 | Stolz ................................. 474/257 X |
| 4,024,605 | 5/1977 | Henke .............................. 24/33 P |
| 4,212,094 | 7/1980 | Pray ................................ 24/33 B X |
| 4,597,137 | 7/1986 | Droppleman et al. ........... 24/33 M X |
| 4,629,353 | 12/1986 | Burke . |
| 4,671,403 | 6/1987 | Schick .............................. 198/844.2 |
| 4,858,280 | 8/1989 | Schick .............................. 24/33 B |
| 5,038,442 | 8/1991 | Stolz et al. ...................... 24/33 B X |
| 5,250,355 | 10/1993 | Newman et al. . |

FOREIGN PATENT DOCUMENTS

| 926645 | 4/1955 | Germany .......................... 24/33 C |
| 2706295 | 8/1978 | Germany .......................... 24/33 B |
| 2901752 | 7/1980 | Germany .......................... 24/33 B |
| 4416079 | 8/1995 | Germany . |

Primary Examiner—Peter M. Cuomo
Assistant Examiner—Hanh V. Tran
Attorney, Agent, or Firm—Herbert Dubno; Andrew Wilford

[57] ABSTRACT

A connector for securing together two belt ends has a pair of similar U-section clips each having a pair of legs secured to the respective belt end and a plurality of spaced knuckles. The knuckles are interleaved to form a transversely extending passage, and a connector rod extends through the passage and interconnects the clips. The rod is made of a hard austenitic manganese steel.

20 Claims, 4 Drawing Sheets

FIG. 3
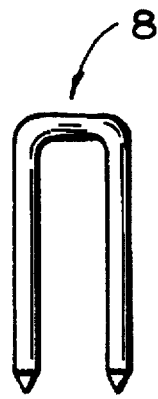
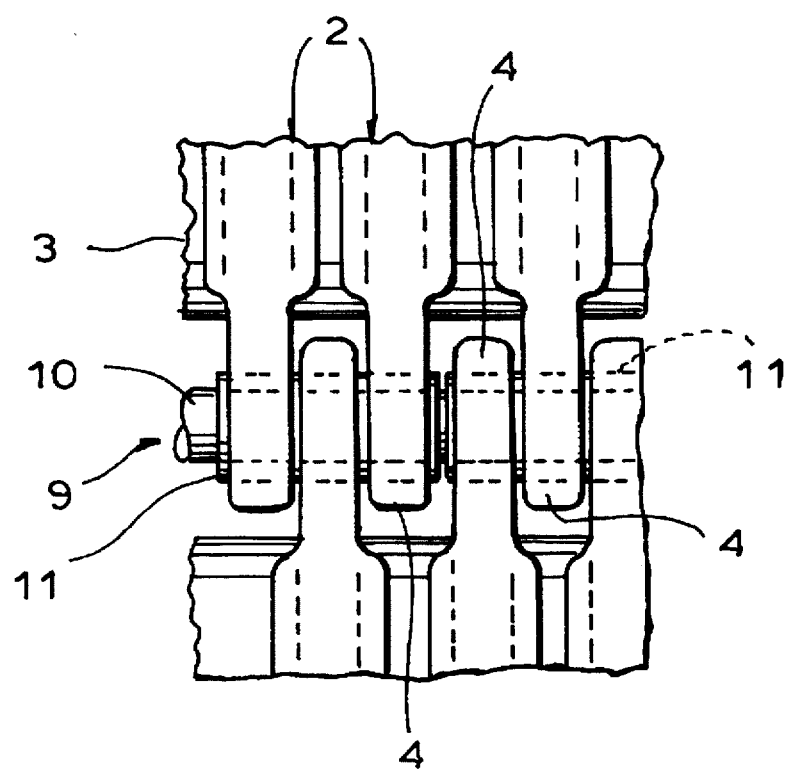
FIG. 11

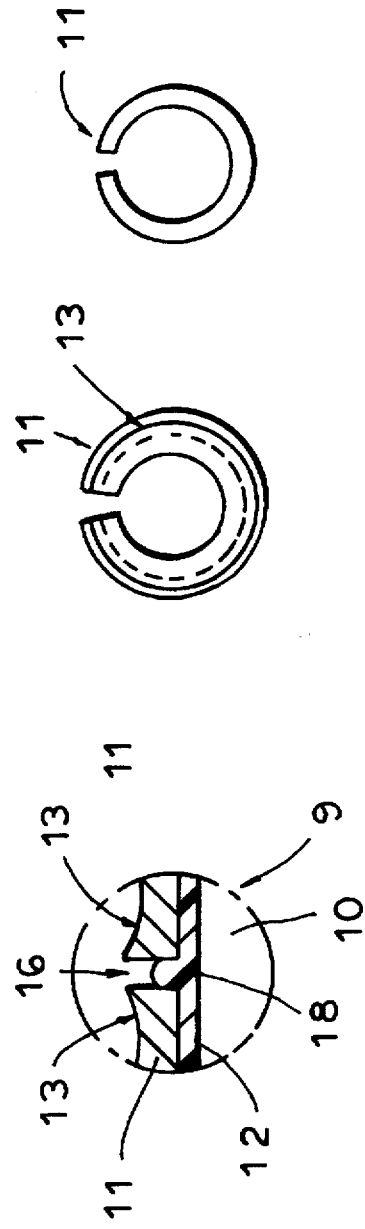

5,701,638

BELT CONNECTOR

FIELD OF THE INVENTION

The present invention relates to a belt connector. More particularly this invention concerns an assembly for hingedly interconnecting two belt ends, as for instance of a flat conveyor belt.

BACKGROUND OF THE INVENTION

A connector for a flat belt comprises at least one pair of U-section end clips interconnected by a transverse coupling pin or rod. Each such clip typically is made of metal and has a pair of legs adapted to embrace the respective belt end and a bight portion interconnecting the outer ends of the legs. Each leg in turn is formed with at least two throughgoing holes that align with the holes of the leg on the opposite face of the belt, and staples are driven through the registering holes from one side of the belt and are crimped over on the other side. The bight portion is formed as at least one loop or knuckle and the loops of the clip or clips of one belt end are interleaved with those of the other belt end and the pin passes through the resultant passage to couple the two belt ends together.

As a result of high stresses, such as tensile, bending and frictional forces, acting on the curved bight portions and the coupling rod, the bight portions and the rod are subjected to extremely heavy wear. The wear results eventually in damage to the rod and bight portions and consequently to the entire conveyor-belt connector. A further result of this damage is expensive repair work and breaks in operation.

For this reason, coupling rods have been developed containing a bunched steel wire core and a helically wound steel jacket. Other embodiments do without the steel jacket and consist of twisted bunches of steel wire. Attempts have even been made to use bunches of glass and carbon fibers, but have not proven effective. The bight portions of belt-connector clips are regularly doubled, either by displacement of ductile material or by crimping over. This procedure, however, does not eliminate wear, and at best delays the damage resulting from wear.

Further a connecting pin for belt connectors for interconnecting the ends of conveyor belts is known from German 4,416,079 of W. Herold wherein core elements of a defined length are disposed inside at least one outer element. In this known connecting pin the outer element is in the form of a relatively soft material which distorts in use while the core elements have a length such as each to extend through more than two hinge loops of the connectors. In this construction the outer element serves only to produce the pin-like structure and for the introduction of the inner elements into the hinge loop zone of the connectors. However, the outer element cannot withstand the stresses occurring because it is made of a relatively soft material which deforms in operation. Instead, the stresses are intended to be transmitted solely by the inner elements. This cannot happen, however, simply because the considerable wear between the hinge knuckles and the connecting pin is bound to lead to early damage and finally destruction of the soft outer element. This leads to loosening of the inner elements.

OBJECTS OF THE INVENTION

It is therefore an object of the present invention to provide an improved flat-belt connector.

Another object is the provision of such an improved belt connector which overcomes the above-given disadvantages, that is which is highly resistant to wear so that it has a long service life.

SUMMARY OF THE INVENTION

A connector for securing together two belt ends has according to the invention a pair of similar U-section clips each having a pair of legs secured to the respective belt end and a plurality of spaced knuckles. The knuckles are interleaved to form a transversely extending passage, and a connector rod extends through the passage and interconnects the clips. In accordance with the invention the rod is made of a hard austenitic manganese steel.

The invention is based on the discovery that an austenitic manganese hard steel has particularly high resistance to wear but good ductility. The hardenability of such manganese hard steel and the resulting hardenability of the surface by cold working are particularly important. The resulting surface hardening occurs precisely at the areas subjected to stress and wear, i.e. in those regions of the coupling rod against which the curved bight portions of the belt-connector clips engage under comparatively high tensile stress. The result is a controlled increase in resistance to wear in the hinge regions. The required resistance to wear is therefore produced at the right place. For this reason, the relatively soft but ductile core of the coupling rod is not a disadvantage, since increasing wear, as a results of the stresses which cause wear, inevitably result in increased surface hardness, so that the core is always surrounded by a wear-resistant jacket. In this connection it should be pointed out that the normal tensile strength of a manganese hard steel is 800 to 900 N/mm$^2$. When used as a belt-coupling rod, the tensile strength increases considerably to $\geq 1500$ N/mm$^2$, as a result of the stresses and consequent cold working between the coupling rod and the curved bight portions of the connector clips. A surprising result in this connection is that the coupling rod remains ductile and fracture-proof in its core, and is particularly characterized by high flexibility or resistance and notch impact strength. This is probably due to the austenitic structure of manganese hard steel and also to the fact that the elongation capacity can be more than 60%. Consequently a coupling rod made of an austenitic manganese hard steel can unexpectedly bend up to 180°. This flexibility is necessary, because conveyor belts are frequently guided in trough or trapezoidal shapes. Another surprising fact is that the resistance to wear is high even when conveying sand or similar materials which cause abrasion between the curved bight portions and the coupling rod, because these are the conditions under which the coupling rod, as a result of stress, is given increased resistance to wear. For this reason, according to another feature of the invention, the connecting clips and consequently the bight portions are likewise made of an austenitic manganese hard steel, i.e. the bight portions, which are stressed areas of the connector clips, also have extremely high resistance to wear. In this case also, increased wear results in increased surface hardness. In this connection also, the toughness and high flexibility or ductility help to prevent tilting between the bight portions and the common coupling rod, and thus to this extent provide a sufficiently flexible conveyor-belt connection. In addition, the high resistance to wear of the belt connectors or clips is also particularly important because there is no longer a risk of wear and ultimate damage when belt scrapers ride over them. Belt scrapers used for cleaning the belts are pressed with considerable force against the surface of the belt for cleaning. The belt scrapers also have wear strips, whose normally abrasive effect when driven over the belt connectors is now compensated by the high resistance to wear of the belt connectors and the hardening thereof when stressed by the belt scrapers. For this reason, preferably also according to the invention, in cases in which the legs of the connector clips have holes for the passage of fixing staples, the staples are likewise made of an austenitic manganese hard steel. As a result of their toughness and resistance to fracture, these staples, besides being highly resistant to wear, ensure that the belt connectors or clips can be efficiently fixed to the ends of conveyor belts. In addition, a particularly intimate connection between the legs of the fixing staples and the belt material is ensured, particularly since conveyor belts are normally webbing type belts.

The coupling rod according to the invention has a solid cross-section and, according to a feature of the invention, the coupling rods and/or connector clips and/or fixing staples are made of an austenitic manganese hard steel X120Mn12 containing by weight C 1.10 to 1.30%
Si 0.30 to 0.50%
Mn 12.00 to 13.00% with smaller proportions of other constituents such as phosphorus and sulphur, e.g. $P \leq 0.10$ and $S \leq 0.04$.

Preferably, the austenitic manganese hard steel is alloyed with up to 0.1% cerium in order to improve the ease of working or machining. The alloy can also contain by weight 1.0% to 4.0% nickel, since nickel has a refining effect on grain formation, with higher ductility for a given strength. The alloy can also contain 1.0% to 2.5% molybdenum, in order further to increase the strength, particularly the elastic limit. Finally the austenitic manganese hard steel can be heat-treated at 850° C. to 1100° C. and tempered or water hardened by quenching at 1000° C. to 1050° C. When quenched, manganese hard steel is relatively soft, but hardens during any strain or cold working in the surface region, whereas the core remains comparatively ductile. As a result of the normal stresses, therefore, the belt connectors, coupling rods and fixing staples become highly wear-resistant but remain surprisingly flexible.

In the case of a belt connector with a connecting pin having a flexible inner member and an outer member in the form of sleeves of predetermined length extending around the inner member, according to the invention, the sleeves are made of a wear-resistant hard material and have a lining of a soft material which is adapted to creep under the pressures it is designed to work at. The result of these features of the invention is that the connecting pin is very adaptable to the stresses and deformations occurring in operation and is highly wear-resistant, since a highly flexible pin inner member can be provided while the sleeves, which form in effect a pin outer member in the form of links, are made of a very wear-resistant material yet can readily follow the bending movements of the pin inner member. In this connection, the creepable lining of the sleeves is very important since because of the changing deformations of the connecting pin the creepable material penetrates into the annular gaps between the sleeves, which are threaded onto the pin inner member at appropriate intervals, and provides the buffering which prevents the hard sleeves from damaging one another due to the stresses and more particularly trough-like deformations of the connecting pin as the conveyor belt rotates. In fact, the connecting pin according to the invention is so flexible that not only a trough-like bending but even a bending through almost 180° can be dealt with satisfactorily by the connecting pin, thanks to its very flexible inner member and to the link-like sleeves disposed on the inner member with the interposition of the lining, the sleeves being able to accommodate the bending movements of the rod inner member in the gap between sleeves, i.e., at the pitch determined by the length of the sleeves. Thanks to the ability of the connecting pin according to the invention to adapt to changing deformations of the rotating conveyor belt, the interconnected belt ends are also subject to less severe stress, i.e., elimination of belt stresses of the kind which otherwise result from the hinge-like connection between the belts when, on the one hand, belt connectors and, on the other hand, a common connecting pin are used. Consequently, not only is the working life of the connecting pin according to the invention lengthened but the connection of an endless rotating conveyor belt is considerably improved overall.

Other features of importance for the invention are listed hereinafter. For instance, the invention suggests, and this proposal is significant on its own, that the sleeves be made of an austenitic manganese hard steel, e.g. of a manganese hard steel X 120 Mn 12 containing:

C 1.10 to 1.30%
Si 0.30 to 0.50%
Mn 12.00 to 13.00%
$P \leq 0.10\%$
$S \leq 0.04\%$.

The sleeves can alternatively be made of a hardened steel or hardened steel alloys which also have high strengths. Metal alloys having elevated strength can also be considered for the production of the sleeves. According to a special feature, the sleeves are made of a tungsten steel having a predetermined elevated, carbon content. A tungsten steel of this kind must have an increased carbon content to ensure that the available carbon is not completely combined with the tungsten to form carbide. In fact the basic composition of the tungsten steel must not become carbon-free if adequate hardenability is to be achieved. Within the scope of the invention the sleeves can also be made of ceramic.

Preferably, the sleeves have a smooth surface. However, the sleeves can have a grooved surface and each groove is adapted for the mounting of a hinge knuckle, so that the hinge knuckles are in a well-defined arrangement on the sleeves. Conveniently, the sleeves are adapted for the mounting of at least three hinge knuckles. The sleeves are in the form of sleeves having an undivided or longitudinally slotted periphery in order to facilitate their assembly on the pin inner member. To this end, the sleeves can be interconnected with one another by way of frangible connecting webs. The webs rupture in operation because of bending stresses and therefore cause no disturbance.

According to another feature of the invention the lining can made of rubber or a creepable plastic, e.g. polyamide. Conveniently, the pin inner member is in the form of a soft or flexible steel cable or a cable of appropriate steel strands. The pin inner member can then be made of corrosion-resistant metals, plastics or textiles or mixtures thereof and can in any case be readily produced as a readily bending and highly flexible pin inner member.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing:

FIG. 3 is an elevational view of a securing staple;

FIG. 7 is a large-scale view of the detail indicated at VII in FIG. 4;

FIG. 8 is a cross section through a longitudinally slotted sleeve for the embodiments of FIGS. 4 and 5;

FIG. 9 is a cross section through a longitudinally slotted sleeve for the embodiment of FIG. 6;

FIG. 10 is a partial broken-away perspective view showing frangible connecting webs of interconnected sleeves the embodiment of FIG. 6, and FIG. 11 is a partial plan detail view of two interconnected ends of a conveyor belt using a belt connector according to the invention.

SPECIFIC DESCRIPTION

Figure 1:
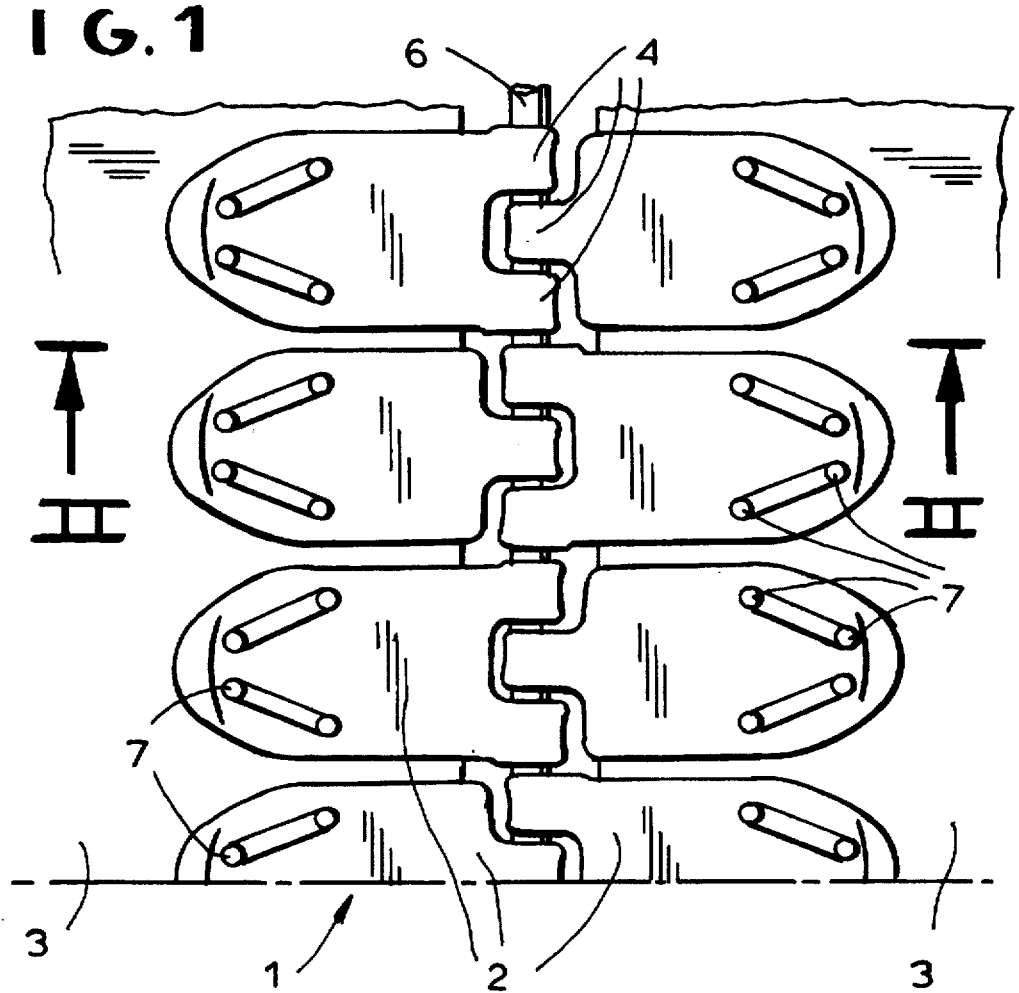
FIG. 1 a partial plan view of a belt connector with interlocking curved bight portions of connecting clips and a common coupling rod.
Figure 2:
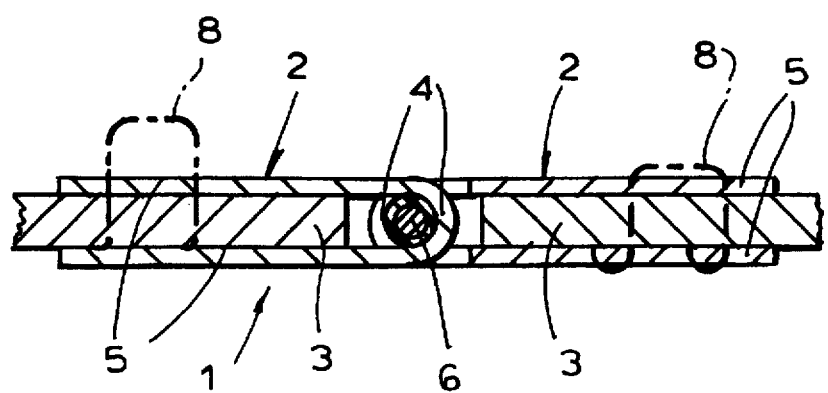
FIG. 2 is a vertical section taken along line II—II of FIG. 1.
Figure 4:
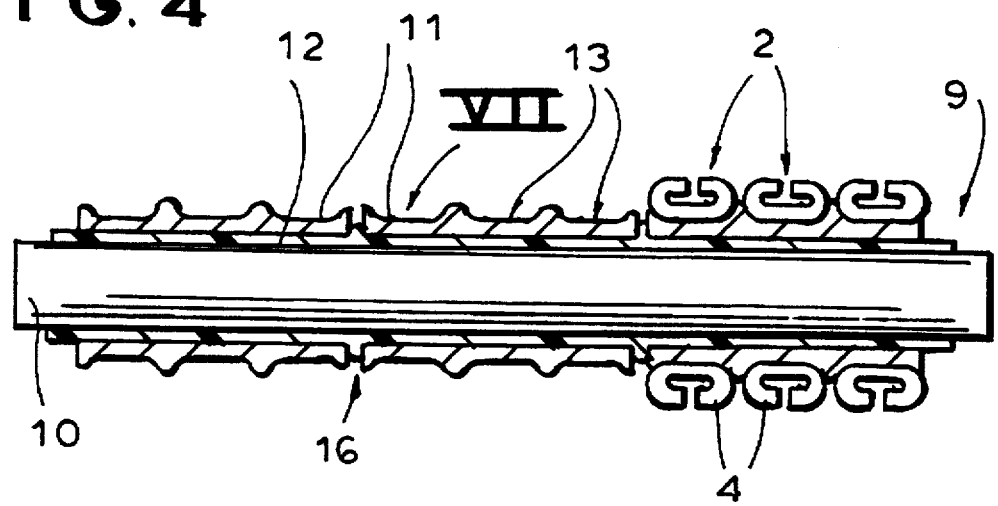
FIG. 4 is an axial section through another connector according to the invention generally corresponding to FIGS. 1 and 2.

As seen in FIGS. 1 to 3 a belt connector 1 comprises two sets of U-shaped clips 2 for coupling ends 3 of conveyor belts. Each clip 2 comprises at least one curved bight portion 4 and parallel legs 5 extending therefrom. A common coupling rod 6 having a solid cross-section is inserted through the pivotably interlocking curved bight portions 4 of two sets of clips 2. The rod 6 and clips 2 are made of an austenitic manganese hard steel. The legs 5 of the clips 2 have holes 7 for driving staples 8 through them. The staple 8 are likewise made of an austenitic manganese hard steel.

The coupling rods 6 and/or connector clips 2 and/or fixing staples 8 are made of a manganese hard steel X120Mn12 containing by weight C: 1.10 to 1.30%
Si: 0.30 to 0.50%
Mn: 12.00 to 13.00%
P: ≦0.10%
S: ≦0.04.

The manganese hard steel can also optionally be alloyed with up to 0.1% cerium, 1.0 to 4.0% nickel and 1.0 to 2.5% molybdenum. When the belt connector 1 or clips 2, rod 6 and staples 8 are in use, the tensile strength increases from 800–900 N/mm$^2$ to at least 1500 N/mm$^2$, while the elongation capacity is at least 45% and normally more than 60%.

FIGS. 4 to 11 show a connecting pin 9 for belt connectors of the type described above, that is having U-shaped connecting clips 2 for interconnecting ends 3 of conveyor belts, the clips 2 having U-shaped bight-portions 4 and the pin 9 extending through the hingedly interengaging portions 4 of two sets of clips 2. The pin 9 has a flexible inner member 10 and an outer member consisting of sleeves 11 of a predetermined length which extend around the inner member 10. The sleeves 11 are made of a wear-resistant hard material and have a lining 12 of a soft material.

Figure 5:
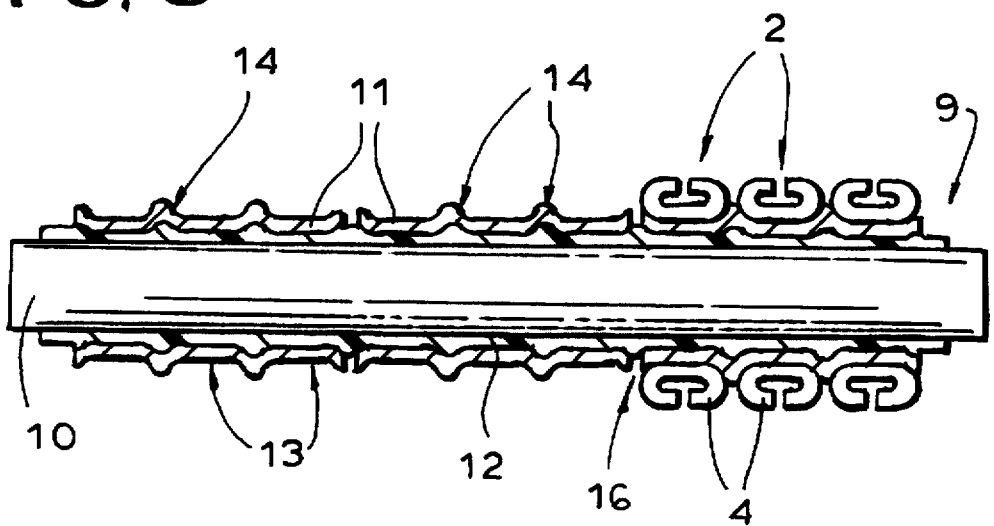
FIGS. 5 and 6 are views like FIG. 4 showing variants on the connector.
Figure 6:
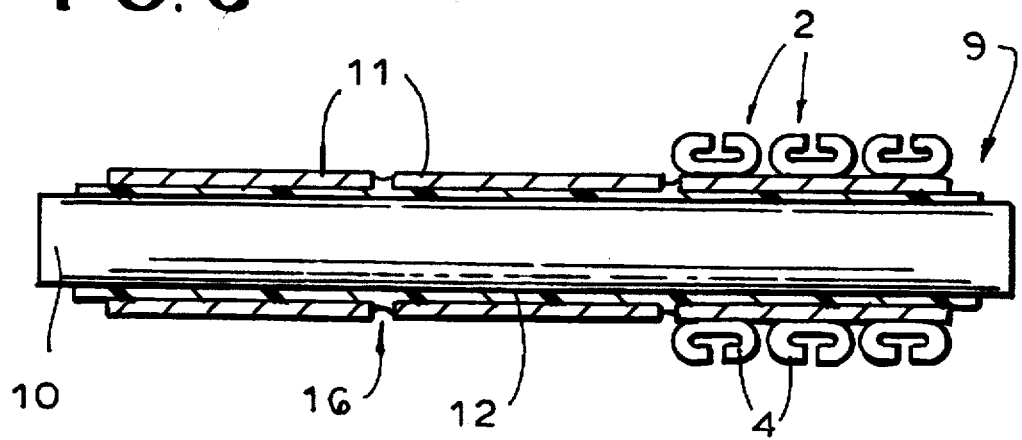

The sleeves 11 are made of an austenitic manganese hard steel. In the embodiment shown in FIGS. 4 and 5 the sleeves 11 each have a surface formed with a radially outwardly open groove 13 adapted for the mounting of a hinge knuckle 4 of the belt connectors. In the embodiment of FIG. 5 the sleeves 11 can be formed internally with annular radially inwardly open grooves 14 to anchor the lining 12. In the embodiment of FIG. 6 the sleeves 11 have a smooth surface—i.e., they are substantially cylindrical.

It is possible within the scope of the invention for sleeves 11 having a smooth surface to alternate with sleeves 11 having a grooved surface, the sleeves 11 which have the grooved surface ensuring non-shifting securing of the pin 9. The sleeves 11 are adapted for the mounting of at least three hinge knuckles 4. The sleeves 11 can have a completely closed periphery. However, the use of longitudinally slotted sleeves 11 is possible and, if for no other reason, is recommended for assembly reasons. The sleeves 11 can therefore be interconnected during manufacture by way of frangible connecting webs 15 which rupture when the pin is in operation so that the flexibility or high bendability of the pin 9 is not compromised.

The sleeve lining 12 can be of rubber or a plastic. Because of the alternate stresses and more particularly bending stresses which occur some of the creepable lining 12 can penetrate into the annular gaps 16 between the sleeves 11 and form a buffer 18 which does not reduce the ability of the sleeves 11 to adapt to distortion or bending movements of the pin inner member 10 but prevents the sleeves 11 from deforming one another due to such deformations or bending movements of the pin inner member 10. In the embodiment of FIG. 11 the pin inner member 10 is a flexible steel cable.

I claim:

1. In combination with two belt ends, a connector comprising:

a pair of similar U-section clips each having a pair of legs secured to the respective belt end and a plurality of spaced knuckles, the knuckles being interleaved to form a transversely extending passage;

a connector rod extending through the passage and interconnecting the clips;

a plurality of outer sleeves surrounding the rod and directly engaging the knuckles, the sleeves each being of a wear-resistant material and having a soft lining of a material capable of plastically deforming; and respective frangible webs each connecting a respective two adjacent outer sleeves together.

2. The belt connector defined in claim 1 wherein the clips are made of a hard austenitic manganese steel.

3. The belt connector defined in claim 1 wherein the connector further comprises respective staples projecting through the legs and through the belt end therebetween, the staples being made of a hard austenitic manganese steel.

4. The belt connector defined in claim 1 wherein the sleeves are made of a steel that comprises by weight C 1.10% to 1.30%,
Si 0.30% to 0.50%, and
Mn 12.00% to 13.00%.

5. The belt connector defined in claim 4 wherein the steel further comprises

Ce 0% to 0.1%.

6. The belt connector defined in claim 4 wherein the steel further comprises

Ni 1.0% to 4.0%.

7. The belt connector defined in claim 4 wherein the steel further comprises

Mo 1.0% to 2.5%.

8. The belt connector defined in claim 4 wherein the steel is tempered by quenching at about 1000° C.

9. The belt connector defined in claim 1 wherein the outer sleeves are made of a hard austenitic manganese steel.

10. The belt connector defined in claim 1 wherein the sleeves are made of hardened steel.

11. The belt connector defined in claim 1 wherein the sleeves are made of a high-strength metallic alloy.

12. The belt connector defined in claim 1 wherein the sleeves are made of carbon-containing tungsten steel.

13. The belt connector defined in claim 1 wherein the sleeves are made of ceramic.

14. The belt connector defined in claim 1 wherein the sleeve has a smooth surface.

15. The belt connector defined in claim 1 wherein the sleeves each have an external outwardly open groove in which the respective knuckles fit.

16. The belt connector defined in claim 1 wherein each sleeve extends through at least three of the knuckles.

17. The belt connector defined in claim 1 wherein each sleeve is formed with a longitudinally throughgoing slot.

18. The belt connector defined in claim 1 wherein the lining is elastomeric.

19. The belt connector defined in claim 1 wherein the rod is a steel cable.

20. The belt connector defined in claim 1 wherein the rod is made of a corrosion-resistant metal, plastic, or textile.

* * * * *